(No Model.)

W. P. TYLER.
CONDUIT FOR ELECTRIC CABLES.

No. 421,088. Patented Feb. 11, 1890.

WITNESSES.
Eva A. Guild
Geo. O. G. Grah

INVENTOR.
William P. Tyler.

UNITED STATES PATENT OFFICE.

WILLIAM P. TYLER, OF BOSTON, MASSACHUSETTS.

CONDUIT FOR ELECTRIC CABLES.

SPECIFICATION forming part of Letters Patent No. 421,088, dated February 11, 1890.

Application filed September 18, 1889. Serial No. 324,361. (No model.)

*To all whom it may concern:*

Be it known that I, WILLIAM P. TYLER, a citizen of the United States, residing in Boston, county of Suffolk, and State of Massachusetts, have invented a new and useful Improvement in Subway-Conduits for Electrical Cables and other Purposes, of which the following is a specification.

All tubular conduits for electrical cables heretofore made are apt to have either a fin or rough edge wherever two tubes are joined either because of the tightness with which the tubes are joined or else because the connecting-tubes are not mathematically alike in cross-section. A rough edge is very apt to damage the cable as it is being drawn through the conduit, scraping off portions of the insulation or injuring the cable-cover, so that it requires repairing, or so catching and holding the cable as to stop its further progress and require it to be withdrawn.

My conduit consists of a series of tubes of peculiar construction joined together, the edge of each tube being expanded into an outwardly-projecting flange, which flange is curved on the inside where it joins the tube, so that no portion of the conduit will present a sharp edge to the cable.

My invention will be understood by reference to the drawings.

Figure 1:
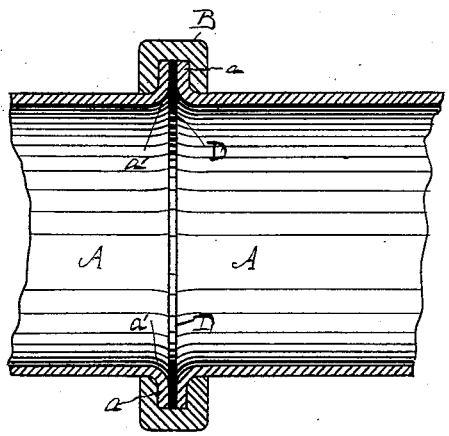
Figure 2:
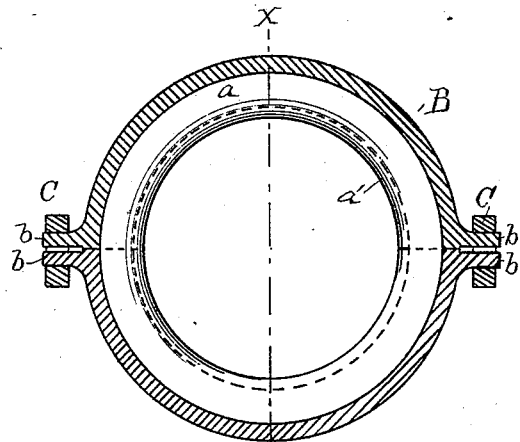
Figure 3:
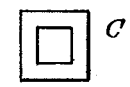
Figure 4:
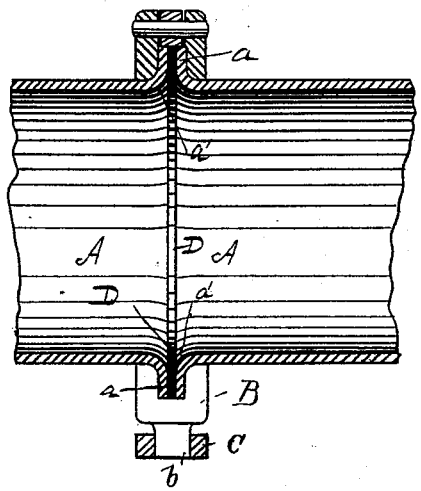
Figure 5:
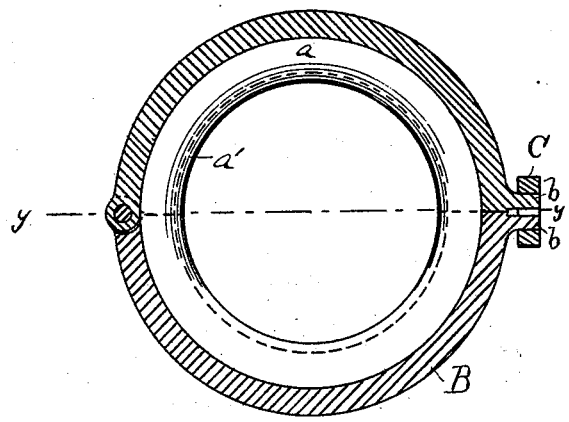

Figures 1 and 4 are longitudinal sections on lines $x\,x$ and $y\,y$ of Figs. 2 and 5, respectively, Figs. 2 and 5 being cross-sections of the conduit at the junction of two tubes. Fig. 3 is a buckle used to join my couplings, as described below.

A A are the tubes. The end of each tube is spread outwardly, so as to form a flange $a$, which shall have a curved inner edge where it joins the tube itself, as indicated at $a'$, this edge forming an easy sliding surface, over or against which a cable can be drawn with but little friction and without damage. Two ways of joining these tubes are shown, although other ways may be adopted, if preferred.

B is a coupling made, as shown, in two or more parts. Each part is concave on its inner surface, so that it is adapted to fit over a portion of the flanges of two adjacent tubes at their junction and hold them together from any end motion. As shown in Fig. 2, each piece B has at each end an ear $b$ projecting at right angles from its outer surface, so that when these couplings are put together about a junction a buckle C (see Figs. 2 and 3) can be fitted over two ears where they come together, and the ends of the ears be upset; or they may be fastened in any other way, and so clamp the coupling about the tube. The two pieces may be connected by an interlocking hook or a hinge joined, as shown in Figs. 4 and 5, the free ends, however, being connected by the buckle, as above described.

If the flange $a$ were angular on the inner side where it joins the tube, unless the tubes fitted each other with mathematical accuracy, which is a practical impossibility, there would be frequently presented a sharp edge to the cable as it is drawn through or as it rests in the conduit, which would be destructive.

D is a gasket, of leather or other suitable material, inserted between the ends of the tubes wherever it is thought desirable. It may be supplied with sufficient tallow or other lubricant on its inner edge or elsewhere when it is inserted to lubricate the cable as it is being drawn through, and so materially assist in the work of the drawing and prevent the cable from being unduly strained. It may of course be used with conduits of other kinds.

These tubes, if metallic, may be cast or drawn, in which latter case the ends of the tubes are struck up in a suitable die.

The couplings can be struck up in a die or cast, and may be made in more than two parts, if thought best.

What I claim as my invention is—

1. The subway-conduit above described, consisting of a series of tubes connected together, each tube being provided with a flange at each end, joined thereto on a curve, as described, and forming a part thereof, whereby throughout the conduit a smooth inner surface will be presented and maintained at the joints, all as set forth.

2. A subway-conduit consisting of a series of tubes of the kind described suitably coupled together and provided at its joints with gaskets D, saturated with a lubricant, as and for the purposes set forth.

3. The tube-coupling above described, consisting of the concave pieces B, provided with ears b, projecting at right angles from the outer surface of each end, in combination with suitable fastenings, as set forth.

4. The tube above described, provided at each end with an outwardly-spreading flange connected thereto, as described, and forming a curved inner edge at the joint, as set forth.

In testimony whereof I have hereunto subscribed my name this 4th day of September, A. D. 1889.

WILLIAM P. TYLER.

Witnesses:
EVA A. GUILD,
GEORGE O. G. COALE.